United States Patent [19]

Kamejima et al.

[11] Patent Number: 5,122,971
[45] Date of Patent: Jun. 16, 1992

[54] METHOD AND APPARATUS FOR CONSTRUCTING STRUCTURES

[75] Inventors: Kohji Kamejima; Tomoyuki Hamada; Ikuo Takeuchi, all of Ibaraki; Toshiaki Yoshinaga, Hitachi; Shigeru Ohcoshi, Takahagi; Ryohei Miyahara, Hitachi, all of Japan

[73] Assignee: Hitachi, Ltd., Tokyo, Japan

[21] Appl. No.: 472,819

[22] Filed: Jan. 31, 1990

[30] Foreign Application Priority Data

Feb. 6, 1989 [JP] Japan .................. 1-27144

[51] Int. Cl.⁵ ............................. G06F 15/00
[52] U.S. Cl. ................... 364/512; 358/107; 364/505
[58] Field of Search ........... 364/512, 550, 505, 506, 364/570; 358/103, 107, 108; 73/865.8, 865.9, 866

[56] References Cited

U.S. PATENT DOCUMENTS

| 4,628,453 | 12/1986 | Kamejima et al. | 358/103 X |
| 4,789,947 | 12/1988 | Maciejczak | 364/512 |
| 4,831,546 | 5/1989 | Mitsuta et al. | 364/512 |
| 4,964,060 | 10/1990 | Hartsog | 364/512 |
| 4,985,855 | 1/1991 | Aldrich et al. | 364/512 |
| 4,992,953 | 2/1991 | Yoshida et al. | 364/512 |
| 5,006,991 | 4/1991 | Ohcoshi et al. | 364/512 |

FOREIGN PATENT DOCUMENTS 0037073 8/1983 Japan.
2194367 3/1988 United Kingdom.

OTHER PUBLICATIONS

Büchler, P., "Qualitätsdatenerfssung und Prozeβ-steuerung im Sinne eines CAQ-Systems", Technische Rundschau, 32/87, pp. 22-29, 31.
Overwien, G., "Kompaktes Werkstück-Erkennungssystem", ZwF, 81 (1986) 2, pp. 89-94.
Spur et al., "Sensorunterstütztes Montagesystem", Robotersysteme, 2 (1986), pp. 3-8.

Primary Examiner—Joseph L. Dixon
Attorney, Agent, or Firm—Antonelli, Terry, Stout & Kraus

[57] ABSTRACT

Information with respect to the shapes and attaching positions of component parts which are necessary for a construction work is stored into a design information memory device by use of a keyboard, an image of a construction location is picked up by a TV camera before the component parts are actually processed, the image is processed to obtain observation information, and the shapes and attaching positions of the component parts are corrected using the observation information and the design information which has already been stored. The corrected information obtained by the correction is stored into a corrected information memory device. A processing device processes the component parts by preferentially using the corrected information. An attaching device attaches the processed component parts to the construction locations while using the corrected information.

6 Claims, 5 Drawing Sheets

F I G. 1
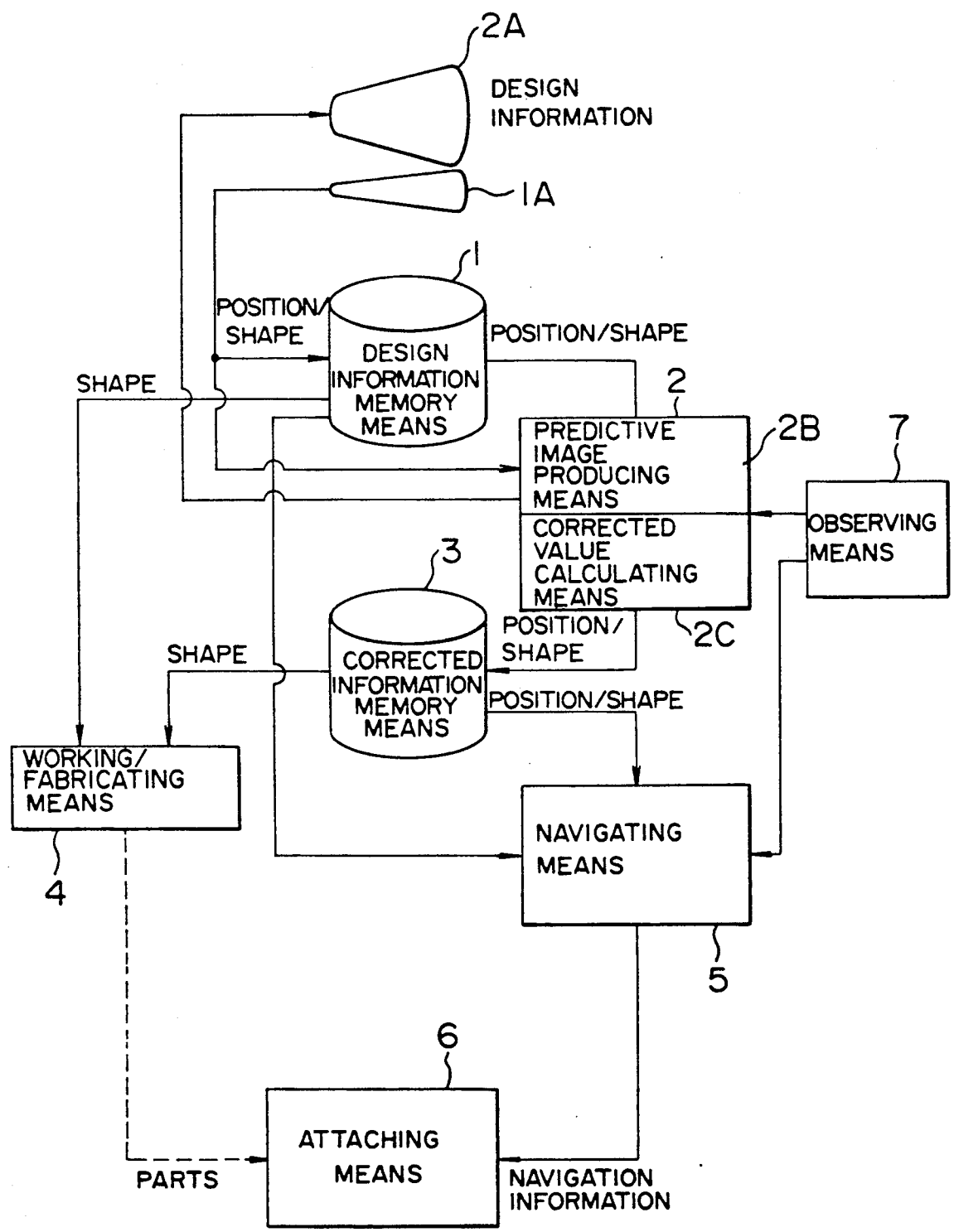

METHOD AND APPARATUS FOR CONSTRUCTING STRUCTURES

BACKGROUND OF THE INVENTION

The present invention relates to an apparatus for constructing factory facilities, buildings, structures, and the like and, more particularly, to a method and apparatus for constructing structures which are supported by a computer.

DESCRIPTION OF THE RELATED ART

When factory facilities, buildings, and the like are constructed, it is inevitable that a change or modification in design is required due to a mutual interference between piping apparatus, equipment, and the like in the building, generation of various errors in the progress of the construction, solution of problems which are found during the course of the construction, or the like. Further, there are many cases where after the construction work has progressed to a certain extent, the shapes and dimensions of parts to be attached are determined on the basis of the situation of the construction work.

Hitherto, there has been known a method whereby in order to eliminate the mutual interference of the piping apparatus, equipment, and the like at the design stage, the reduced models of the piping apparatus and equipment are formed and the spacings, arranging directions, positions, and the like of the parts are examined. As a technique to design on the basis of reduced models which were formed as mentioned above, there has been known a technique disclosed in JP-A-60-37073, in which sensors to read the coordinates and shapes of the models are provided and the information of the coordinates and shapes is directly input to a computer.

In such a design change or modification during construction and a determination of the design after the progress of the construction, the information relating thereto is individually transmitted through workers by means of various routes. Therefore, the flow of the series of design information and parts such as designing—manufacturing—assembling is frequently obstructed and delays and errors in the construction are easily caused.

SUMMARY OF THE INVENTION

It is an object of the invention to provide a method and apparatus for constructing structures in which design information necessary to execute a construction work can be commonly used among sub-processes for designing, manufacturing, and assembling without passing through workers.

Another object of the invention is to provide a method and apparatus for constructing structures in which information necessary to execute a construction work can be corrected by use of a computer, the corrected information can be commonly used among sub-processes for designing, manufacturing, and assembling, and the construction work can be promptly executed.

In accordance with one feature of the present invention an apparatus for constructing a structure or building comprises memory means for storing shapes and attaching positions of component parts; correcting means connected to the memory means, for correcting the shapes and/or attaching positions of the component parts which have been stored in the memory means; working means connected to the memory means, for working or fabricating the component parts on the basis of an output of the memory means; navigating means connected to the memory means, for outputting navigation information; and attaching means, connected to the navigating means, for attaching the component parts on the basis of the navigation information from the navigating means.

Another feature of the invention comprises memory means for storing shapes and attaching positions of component parts; correcting means connected to the memory means, for correcting the shapes and/or attaching positions of the component parts; corrected information memory means connected to the correcting means, for storing the corrected shapes and/or attaching positions; working means connected to the corrected information memory means and the memory means, for working or fabricating the component parts on the basis of outputs of both of the memory means; navigating means connected to the corrected information memory means and the memory means, for outputting navigation information; and attaching means, connected to the navigating means, for attaching the component parts on the basis of the navigation information which is outputted from the navigating means.

A method according to one feature of the invention comprises the steps of: storing design information regarding a construction work before the construction work is started; obtaining observed information with respect to constructing locations; correcting the design information before the processing works of the component parts which are used for the constructing work are started on the basis of the observed information and the design information stored; storing the design information after the correction; and executing the processing works of the component parts and attaching works of the processed component parts on the basis of the design information after the correction.

The above and other objects and features of the present invention will be apparent from the following description.

BRIEF DESCRIPTION OF THE DRAWINGS

FIG. 1 is a block diagram showing a construction of an embodiment of the present invention;

DESCRIPTION OF THE EMBODIMENT

Figure 2:
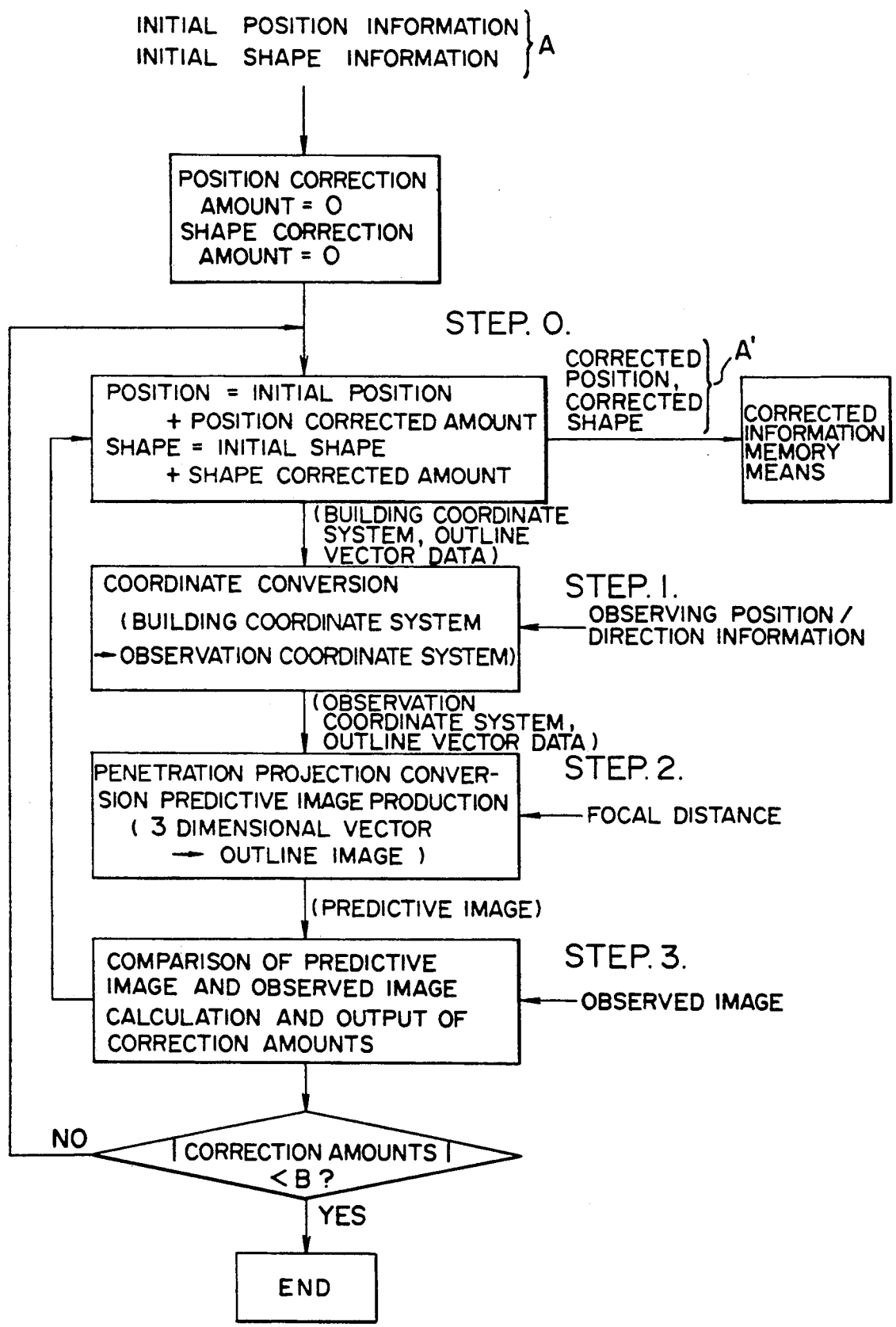
FIG. 2 is a block diagram showing an example of a procedure of correcting means in the invention.

An embodiment of the present invention will be described with reference to FIG. 1. The embodiment comprises: design information memory means 1; correcting means 2 connected to the memory means 1; corrected information memory means 3 connected to the correcting means 2; working means 4 connected to the memory means 1 and the corrected information memory means 3; navigating means 5 connected to the memory means 1 and the corrected information memory means 3; attaching means 6 connected to the navigating means 5; and a TV camera as observing means 7 connected to the correcting means 2 and the navigating means 5.

The design information memory means 1 stores the design information with respect to a construction work which was inputted to a computer through input means 1A. such as a keyboard. The design information includes data regarding shapes of component parts to be constructed and data with respect to positions at which the component parts are attached. The design information is formed before the start of the construction work, that is, at the designing stage and stored in the memory means 1.

Practically speaking, the observing means 7 is a TV camera or the like and photographs a constructions location, namely, attaching positions of the component parts and photoelectrically converts the photographed images of the attaching positions, thereby forming observed images. The observed images are supplied as electric signals to the correcting means 2 and navigating means 5. Such photographing operations are executed before the processing work or fabrication process of each of the component parts to be constructed is started. That is, when attention is paid to the processing or working of a certain part, the attaching position of the part is photographed and, thereafter, the part is processed. This is because a consideration is made on the assumption that there is a case where in the actual situation, the part cannot be attached at the scheduled shape and position, or even if the part could be attached, various inconveniences occur and it is necessary to detach and abandon the attached part or to again process the part. As will be explained below, the initial design information is corrected on the basis of the actual observed information, and the component parts are processed by using the corrected design information. Thus, the occurrence of such a problem can be remarkably reduced.

The correcting means 2 can be realized by a general computer and has the functions to compare the attaching position/shape data of the component parts based on the observed images which are input from the observing means with the attaching position and shape data of the component parts which were read out from the memory means 1 and to correct the attaching position and shape data of the component parts. The correcting means 2 outputs the design information after the correction and stores it into the corrected information memory means 3. For this purpose, the correcting means 2 has: predictive image producing means 2B for producing images which are predicted to be obtained when the attached component parts are photographed by the TV camera on the basis of the design information which was read out from the memory means 1 and the installed position, photographing direction, and focal distance of the TV camera as the observing means; and means 2C for overlapping the observed images and the predictive images and calculating the correction amounts of the shapes and/or positions of the component parts and outputting the corrected design information to the corrected information memory means. The result of the correction is displayed by a display means 2A such as a CRT display or the like. The operator gives an instruction from the keyboard 1A to the correcting means 2 as needed. A processing procedure of the correcting means will be described in detail below.

In the embodiment, the corrected information memory means 3 has been provided separately from the memory means 1. However, the position/shape data of the memory means 1 can be also rewritten as the corrected position/shape data without providing the corrected information memory means 3.

The working means 4 receives the design information regarding the component parts and executes the mechanical, electrical, and chemical processes on the basis of the design information, thereby manufacturing the component parts necessary for the construction work. That is, the processing means 4 processes the component parts on the basis of the shape data of the component parts which was read out from the memory means 1 and the shape data of the component parts which was read out from the corrected information memory means 3. In this case, if the shape data of the same component part has been stored in the memory means 1 and corrected information memory means 3, the latter shape data, namely, the corrected information, is used.

The working means 4 includes apparatuses such as a machining apparatus and a manufacturing apparatus, and is provided to produce parts or components necessary for construction.

The navigating means 5 compares the position/shape data which was read out from the memory means 1 and corrected information memory means 3 with the observed images as observed information which is output from the observing means and outputs the navigation information to navigate the component parts which are displayed in the observed images to the attaching positions as the component part positions which are displayed in the predictive image. The navigating means for navigating the attaching means by using the observed image has been disclosed in detail in U.S. Pat. No. 4,628,453.

The attaching means 6 attaches parts which were processed by the working means 4 or which were purchased to the positions which are displayed in the predictive image on the basis of the navigation information. If the position/shape data of the same component parts has been stored in the memory means 1 and corrected information memory means 3, the latter data is preferentially used.

A processing procedure in the correcting means 2 will now be described in detail.

FIG. 2 shows the information processing procedure in the correcting means 2. In the procedure, a predictive image which is presumed to be obtained when the attached component part is observed by the TV camera is first produced on the basis of the initial values A of the position and shape of the parts which were read out of the memory means 1, the position and observing direction of the TV camera, and the focal distance of the TV camera. The predictive image is produced and corrected in the following procedure.

Step 1: A part outline vector as the initial values A which are expressed by the building coordinate system is converted into the observation coordinate system. At this time, the installed position and direction of the TV camera for observing as the observing means 7 which is installed in the construction field are measured and inputted as the observing position and direction.

Step 2: The part outline vector converted into the observation projection is converted by use of the focal distance of the observing TV camera and a part outline image as a predictive image is produced. The predictive image is an image which is predicted to be obtained when a target part is observed by the observing TV camera.

Step 3: Next, the predictive image and the actual image which was picked up by the observing TV camera are compared. Correction amounts for the initial values of the position and shape necessary to make the predictive image coincide with the observed image are calculated.

Step 0: The calculated correction amounts are added to the initial values A and the initial values A are updated to initial values A'. The initial values A' indicative of the corrected position and shape are outputted to the corrected information memory means. The processes in steps 1, 2, 3, and 0 are repeated on the basis of the updated initial values A'. When the absolute value of the correction amounts is lower than a predetermined value B, the above procedure is finished. In the corrected information memory means, each time the new initial values A' are inputted, the data is updated. The initial values A' which are inputted last are stored as the corrected position information data.

Figure 3:
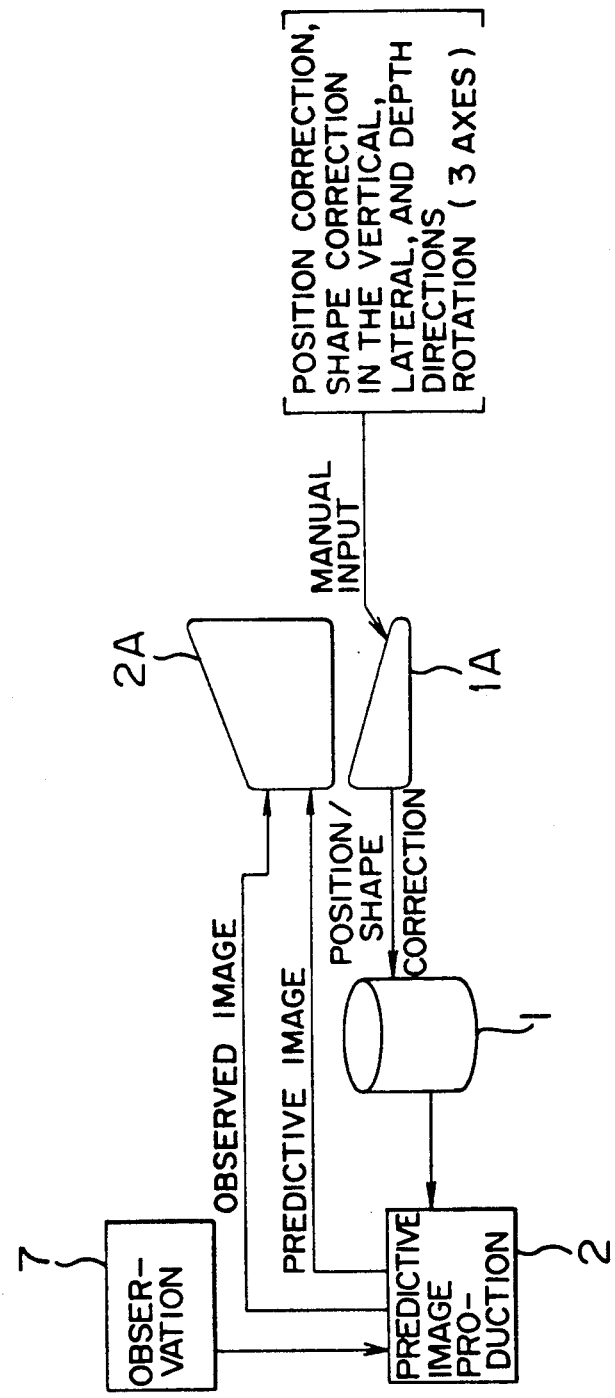
FIG. 3 is a block diagram showing an example in the case of correcting positions and shapes by manual inputting operations.

The position/shape correcting procedure in step 3 in FIG. 2 is shown in FIG. 3. First, the predictive image produced in step 2 in FIG. 2 and the actual observed image which is actually input are overlappingly displayed on the screen of the same display 2A. On the basis of the display, the operator recognizes errors of the position and shape. The correction amounts of the predictive image are input so as to reduce the errors. The correcting input is executed through the keyboard 1A (hereinafter, referred to as a KB) with respect to the movements in the vertical, lateral, and depth directions of the image and with regard to the rotations regarding the above three axes. However, as shown in the procedure of FIG. 2, it is not always necessary to obtain the accurate position and image by a single correcting process. It is sufficient for the operator to input only the quantitative correction amounts. Therefore, such correction amounts can be fairly easily calculated.

The initial values of the position and shape can also be automatically corrected by overlapping the observed image on the predictive image. The principle in such a case will now be described with reference to FIG. 5.

Figure 5:
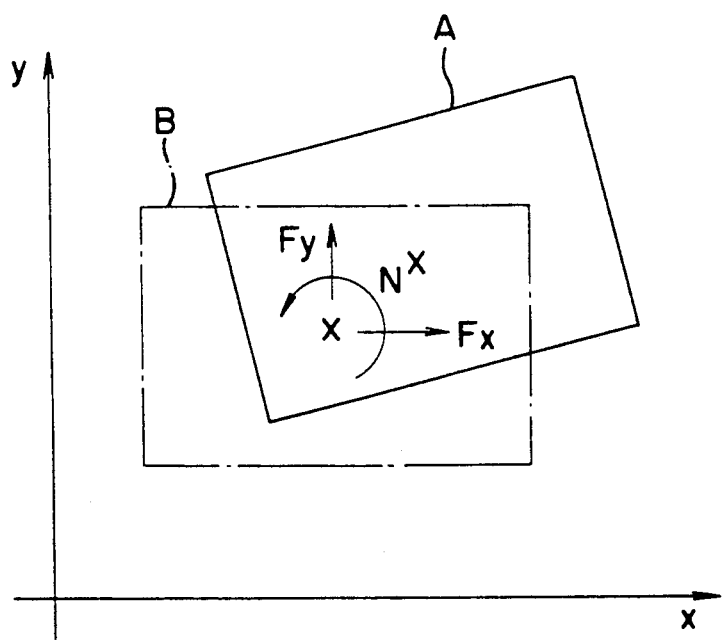
FIG. 5 is a concept diagram showing the principle of the automatic correction of positions and shapes.

In FIG. 5, the predictive image A is deviated from the observed image B. The predictive image A and the binarized observed image B are expressed by functions a(x, y) and b(x, y) on a two-dimensional plane. A two-dimensional potential field $\phi(x, y)$ which is defined by $$\frac{\partial^2 \phi}{\partial x^2} + \frac{\partial^2 \phi}{\partial y^2} + a(x, y) = 0 \quad (1)$$

will now be considered. Forces which act on the pattern in the case where the observed image B is put in the potential field and a synthetic force of the moment are defined as follows.

$$Fx = \int s b(x, y) \cdot \frac{\partial \phi}{\partial x} ds \quad (2)$$

$$Fy = \int s b(x, y) \cdot \frac{\partial \phi}{\partial y} ds \quad (3)$$

$$N = \int s b(x, y) \left( (x - x_0) \frac{\partial \phi}{\partial y} - (y - y_0) \frac{\partial \phi}{\partial x} \right) ds \quad (4)$$

S denotes a whole region on the image plane and $(x_0, y_0)$ indicates a position of the center of gravity of the observed image B. The potential field $\phi(x, y)$ has a shape similar to that of the electric field which is generated when charges are given to the predictive image A. The forces $F_x$ and $F_y$ and the moment N are similar to the forces which act when charges opposite to those applied to the predictive image A are given to the observed image B. Therefore, in a state in which the predictive image A and the observed image B are overlapped by a certain extent, the forces $F_x$ and $F_y$ and the moment N act in a direction such as to completely overlap both of the images A and B. Therefore, the observed image B is deviated in the direction of $(F_x, F_y)$ by only $(d_x, d_y)$ and is also rotated in the direction of N by only $d\theta$ around the center of gravity and the $F_x$, $F_y$, and N are again calculated. By repeating the above processes, the observed image B can be overlapped so as to match the predictive image A.

Figure 4:
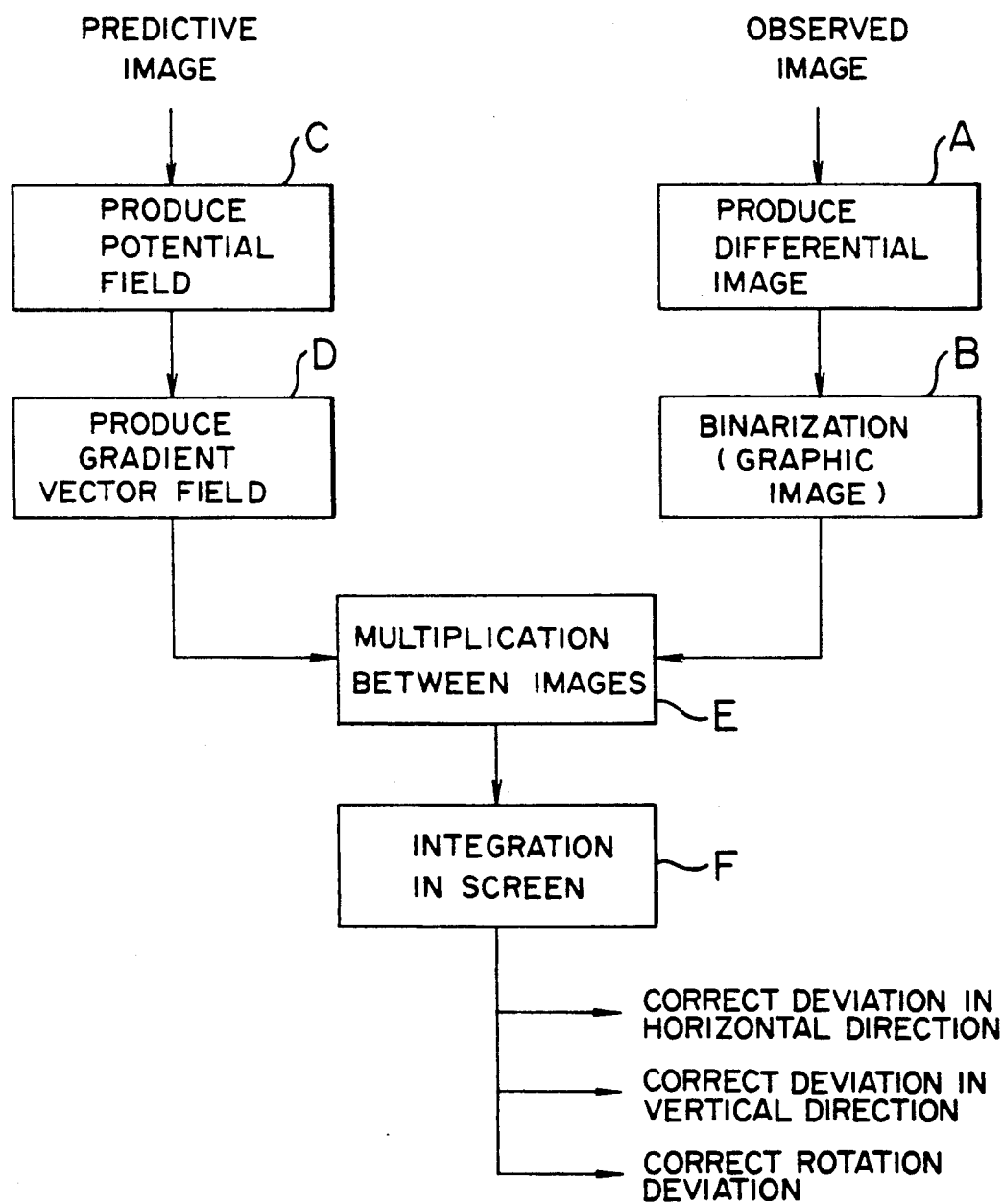
FIG. 4 is a block diagram showing a procedure in the case of automatically correcting positions and shapes.

FIG. 4 shows a procedure to automatically correct the initial values of the position and shape by the overlapping process of the images due to the above principle. In the procedure, the observed image is first processed to obtain a differential image (step A). Next, the differential image is binarized and expressed by a graphic image (step B). On the other hand, a two-dimensional potential field based on the predictive image is calculated (step C). A gradient vector field based on the two-dimensional potential field is produced (step D). Next, the binarized observed image is overlapped on the predictive image with the gradient vector field and the forces exerted on both images are calculated at every pixel (step E). The calculated forces are integrated or accumulated with respect to all of the pixels constructing the screen (step F). The forces $F_x$ and $F_y$ and the moment N which are integrated with regard to the whole screen are the forces which act in the direction such as to eliminate the deviation between the images A and B. The image position is corrected in the direction of those forces. The above processes are repeated for the corrected image position and the correction is repeated. When the correction amount is lower than a predetermined amount, it is determined that the overlapping process of both images has been finished. The initial values A' to which the amounts of the correction of the image position which have been executed so far have been adjusted are outputted to the corrected information memory means 3.

The above embodiment has been described on the assumption that the data which was input to the correcting means 2 is changed. However, there is a case where a part or all of the shapes or positions must not be deviated from the initial values A in dependence on the characteristics of the component part. In such a case, the writing of such a portion in the data is inhibited. If there is a difference between the predictive image and the observed image in such a portion, an alarm is generated.

According to the embodiment, the processing means and attaching means are controlled on the basis of the design information stored in the memory means. Therefore, the design information can be transmitted and received among the sub-processes without needing any worker, and the generation of errors during the transmission and reception of the design information is avoided. Further, the difference between the design value and the actual value which is caused due to the progress of the construction work is promptly detected by the comparison of the images. The design information stored in the memory means is corrected on the basis of such a difference. Therefore, there are advantages such that it is unnecessary to individually correct the design information for processing and attaching, the generation of errors is reduced, and the number of workers can be decreased.

According to the invention, since the design information stored in the memory means is output to the working means and attaching means without needing any worker, the generation of errors due to the erroneous transmission of the information during the outputting operation and a time delay in the information transmission is eliminated and the number of workers (manpower) can be reduced. On the other hand, the information of the attaching positions of the component parts is output as an image. The difference between the design information stored in the memory means and the actual information is detected and corrected on the basis of such an image. Therefore, it is possible to promptly cope with the actual situation, and the number of workers for the above purpose can be also reduced.

We claim:

1. An apparatus for constructing a structure comprising:
   memory means for storing information about shapes and attaching positions of component parts for the structure;
   observing means for picking up an observed image of the attaching positions of the component parts as observation information;
   correcting means connected to said memory for correcting at least one of the shapes and the attaching positions of the component parts based on the information stored in said memory means and the observation information from said observing means, and for correcting the information stored in said memory means based on the corrected at least one of the shapes and the attaching positions;
   working means connected to said memory means for producing said component parts based on the corrected information stored in said memory means;
   navigating means connected to said memory means for generating, through an arithmetic operation, navigation information based on the corrected information stored in said memory means, and for outputting the navigation information; and
   attaching means connected to said navigating means for attaching the component parts based on the navigation information outputted from the navigating means.

2. The apparatus according to claim 1, wherein said correcting means includes:
   predictive image producing means for producing a predictive image of the component parts which is predicted to be picked up by the observing means based on the information stored in said memory means and a position and an observing direction of said observing means; and
   processing means for overlapping the observed image and the predictive image, for calculating correction amounts of at least one of the shapes and the attaching positions of the component parts based on the overlapped observed and predictive images, and for correcting the information stored in said memory means based on the calculated correction amounts.

3. The apparatus according to claim 1, wherein data indicative of whether correction of the information about shapes and attaching positions stored in the memory means is to be permitted or inhibited is stored in said memory means.

4. An apparatus for constructing a structure comprising:
   first memory means for storing design information about shapes and attaching positions of component parts for the structure;
   correcting means connected to said first memory means for correcting at least one of the shapes and the attaching positions of the component parts based on the design information stored in said first memory means;
   second memory means connected to said correcting means for storing corrected design information based on the corrected at least one of the shapes and the attaching positions;
   working means connected to said first and second memory means for producing the component parts based on the design information and corrected design information respectively stored in said first and second memory means;
   navigating means connected to said first and second memory means for outputting navigation information based on the design information and corrected design information respectively stored in said first and second memory means; and
   attaching means connected to said navigation means for attaching the component parts based on the navigation information outputted from said navigating means.

5. The apparatus according to claim 4, further comprising observing means connected to said correcting means for picking up an image of the attaching positions of the component parts as an observed image;
   wherein the correcting means includes:
   predictive image producing means for producing a predictive image of the component parts which is predicted to be picked up by said observing means based on the design information stored in said first memory means and a position and an observing direction of said observing means; and
   processing means for overlapping the observed image and the predictive image, for calculating correction amounts of at least one of the shapes and the attaching positions of the component parts based on the overlapped observed and predictive images, for reading out and correcting the design information stored in said first memory means based on the calculated correction amounts, and for storing the corrected design information in said second memory means.

6. The apparatus according to claim 5, wherein said processing means includes means for recognizing a deviation amount between the overlapped observed and predictive images and for calculating the correction amounts based on the recognized deviation amount.

* * * * *